United States Patent
Winkes

(10) Patent No.: US 11,236,726 B2
(45) Date of Patent: Feb. 1, 2022

(54) ASSEMBLY COMPRISING A FIRST AND A SECOND MEMBER AND A CONNECTOR, AND A METHOD OF ASSEMBLING SUCH AN ASSEMBLY

(71) Applicant: SIEMENS GAMESA RENEWABLE ENERGY B.V., The Hague (NL)

(72) Inventor: Jasper Winkes, The Hague (NL)

(73) Assignee: C1 CONNECTIONS HOLDING B.V., The Hague (NL)

(*) Notice: Subject to any disclaimer, the term of this patent is extended or adjusted under 35 U.S.C. 154(b) by 0 days.

(21) Appl. No.: 17/265,233

(22) PCT Filed: Aug. 9, 2019

(86) PCT No.: PCT/IB2019/056792
§ 371 (c)(1),
(2) Date: Feb. 2, 2021

(87) PCT Pub. No.: WO2020/035770
PCT Pub. Date: Feb. 20, 2020

(65) Prior Publication Data
US 2021/0310464 A1    Oct. 7, 2021

(30) Foreign Application Priority Data
Aug. 13, 2018 (NL) ..................... 2021462

(51) Int. Cl.
*F03D 13/10* (2016.01)

(52) U.S. Cl.
CPC .......... *F03D 13/10* (2016.05); *F05B 2230/61* (2013.01); *F05B 2240/91* (2013.01); *F05B 2240/95* (2013.01); *F05B 2260/301* (2013.01)

(58) Field of Classification Search
CPC .. F03D 13/10; F05B 2230/61; F05B 2240/91; F05B 2240/95; F05B 2260/301; F16B 19/1081
See application file for complete search history.

(56) References Cited

U.S. PATENT DOCUMENTS

| 1,109,094 A | 9/1914 | Weckbaugh |
| 1,120,409 A | 12/1914 | Rohmer |

(Continued)

FOREIGN PATENT DOCUMENTS

| CN | 105971827 A | 9/2016 |
| CN | 205669461 U | 11/2016 |

(Continued)

OTHER PUBLICATIONS

International Search Report and Written Opinion for the International Patent Application No. PCT/IB2019/056792, dated Nov. 12, 2019, 12 pages.

(Continued)

*Primary Examiner* — Lee A Holly
(74) *Attorney, Agent, or Firm* — Kacvinsky Daisak Bluni PLLC

(57) ABSTRACT

An assembly includes a first and a second member, where the second member has a fork-shaped cross section with a main body and two substantially parallel walls that each comprise at least one through hole and the first member is arranged between the two walls of the second member, having a through hole. The through hole of the first member and the through holes of the second member define a channel. A connector is axially insertable in the channel to an end position and consecutively expandable radially relative to said channel, to connect the first and second member relative to each other. The connector, in an expanded state thereof, pushes the first member against the main body of the second member to define a pre-tensioned connection (Continued)

between the first member and the second member. A method of assembling a first and a second member.

16 Claims, 10 Drawing Sheets

(56) References Cited

U.S. PATENT DOCUMENTS

| | | | | |
|---|---|---|---|---|
| 3,710,674 | A | * | 1/1973 | Tabor .................. F16B 19/1081 411/61 |
| 4,684,280 | A | | 8/1987 | Dirkin et al. |
| 2008/0080946 | A1 | | 4/2008 | Livingston et al. |

FOREIGN PATENT DOCUMENTS

| | | | |
|---|---|---|---|
| CN | 106194605 | A | 12/2016 |
| CN | 106286524 | A | 1/2017 |
| EP | 2187506 | A1 | 5/2010 |
| EP | 3171040 | A1 | 5/2017 |
| JP | S59140289 | U | 9/1984 |
| JP | 2003254308 | A | 9/2003 |
| WO | 2018139929 | A1 | 8/2018 |

OTHER PUBLICATIONS

International Preliminary Report on Patentability for the International Patent Application No. PCT/IB2019/056792, completed Dec. 7, 2020, 7 pages.

* cited by examiner

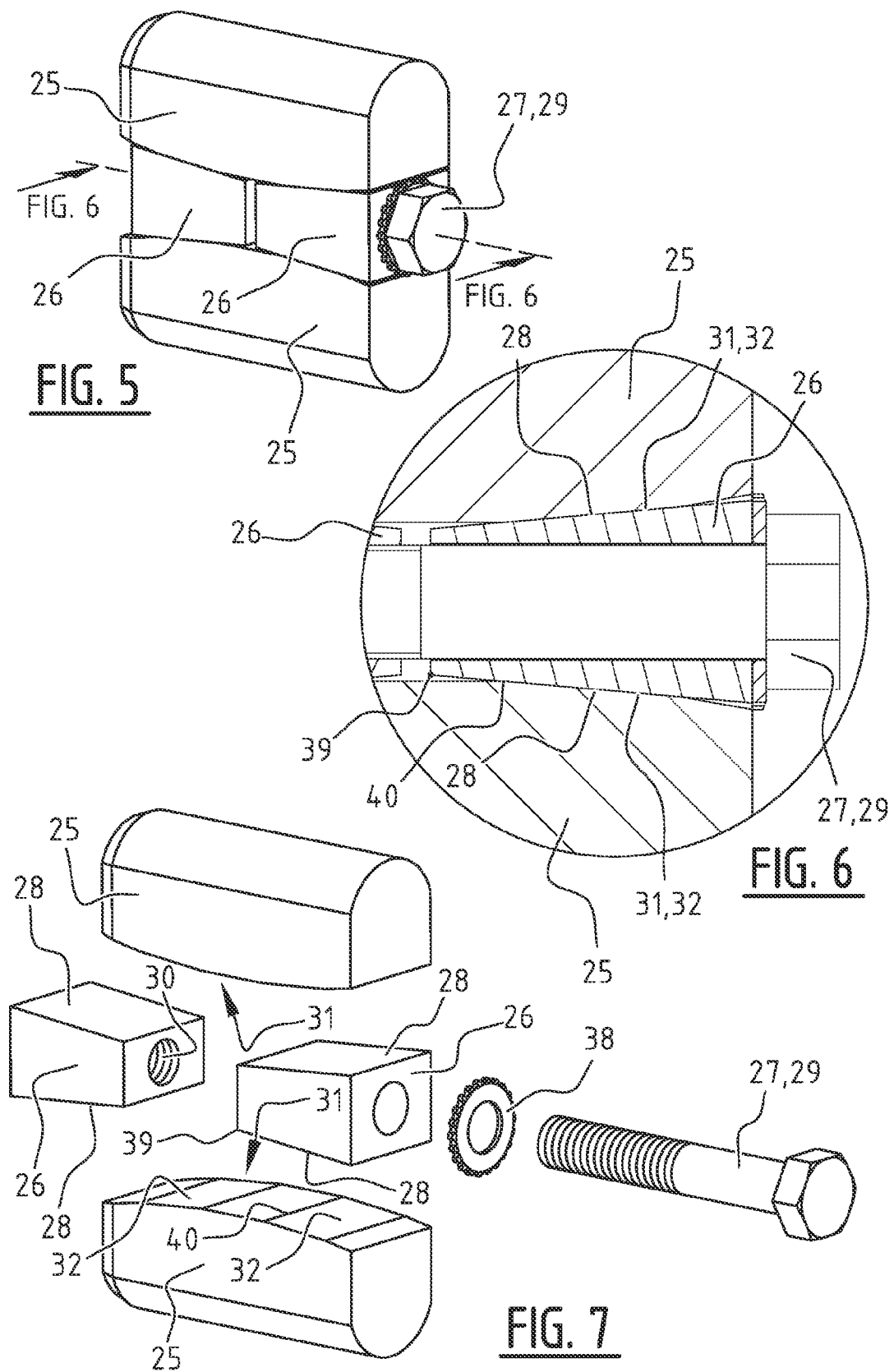

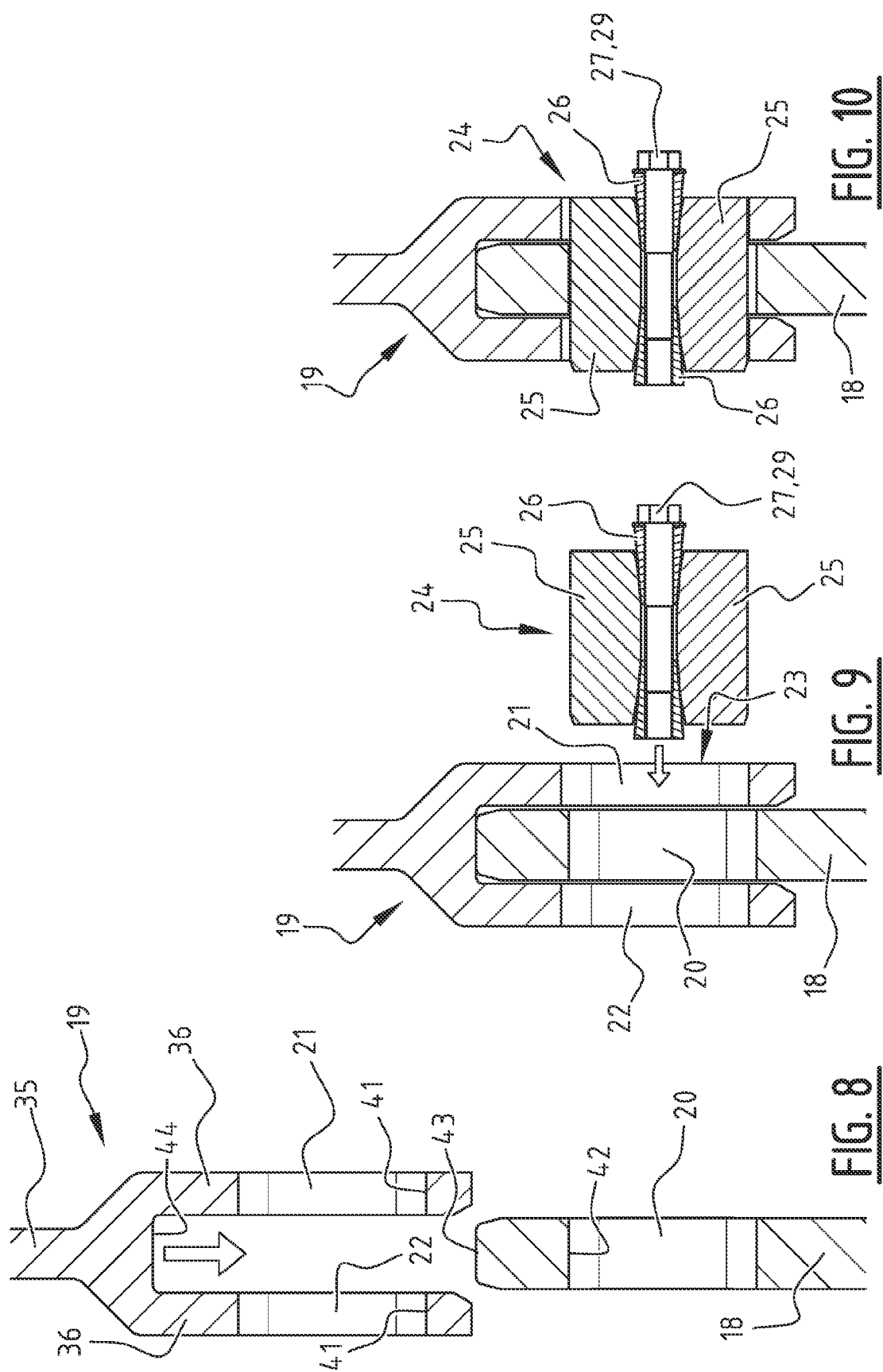

ASSEMBLY COMPRISING A FIRST AND A SECOND MEMBER AND A CONNECTOR, AND A METHOD OF ASSEMBLING SUCH AN ASSEMBLY

This is a national stage application filed under 35 U.S.C. § 371 of pending international application PCT/IB2019/056792, filed Aug. 9, 2019, which claims priority to Netherlands Patent Application No. 2021462, filed Aug. 13, 2018, the entirety of which applications are hereby incorporated by reference herein.

The present invention relates to an assembly, comprising a first and a second member, and a connector to connect the first and second member relative to each other.

The invention further relates to a method of assembling such an assembly of a first and a second member that each comprise at least one through hole.

The present invention is particularly suitable for offshore applications, e.g. for connecting a wind turbine to a monopile, a wind turbine to a transition piece, a transition piece to a monopile, as well as between members of a monopile or wind turbine, and jacket connections.

According to prior art applications in offshore, the members of such assemblies are provided with flanges which are connected using bolts of significant size. Currently M72 bolts are used for connecting a wind turbine tower to a monopile or transition piece. In a first step, these bolts are electrically tightened with 8.000 Nm. In a second step, the preload is increased with hydraulic tools to 22.000 Nm. The bolts itself are heavy and the tools for tightening the bolts is also heavy and hard to handle.

It appears that the actual preload on the bolts after some settling time is hard to predict and control, and may vary significantly. Although it is not exactly clear which factors influence the torque-tension relationship of the bolts, it may be concluded that installing the bolts using a "constant torque" method does not achieve satisfying results. Similar issues occur with tensioning systems for bolting. The preload on the bolts must be regularly checked and adjusted, periodically requiring significant maintenance work.

Furthermore, the bolts are arranged all around the circumference of the flanges, leaving only a very limited gap between adjacent bolts. A connection using flanges with bolts is insufficiently scalable to meet the ever increasing demands resulting from even larger wind turbines and greater depths as sea where they are installed.

International patent application WO 2018/139929 A1 of Applicant proposes an assembly that is improved relative to a connection using flanges connected by bolts. This improved prior art assembly comprises:
- a first and a second section, each comprising a longitudinal axis;
- a fixation configured to fix the first and the second section;
- wherein at least one of the first and the second section comprises a body that is configured to be engaged by the fixation; and
- wherein the fixation comprises an abutment and a radially displaceable actuator.

The actuator is radially displaceable with respect to the longitudinal axis of the section that comprises the actuator. This allows the actuator itself to be employed as part of a clamp. During radial displacement of the actuator, an inclined surface of the actuator engages a specially machined surface of the first section and gradually increases the clamping force that connects the first and the second section. Although the assembly of WO 2018/139929 A1 already provides a significant improvement relative to the above-described prior art connections using flanges connected by bolts, Applicant now proposes even further improvements. Radial displacement of the actuator required a significant force due to the clamping action. Moreover, sections with a specially designed contact surface were required.

The United States patent application US 2008/080946 A1 is directed to an expansion pin system for construction of a wind turbine structural tower, and is considered the closest prior art. It discloses, in terminology of the present invention, a first and a second member, wherein the second member has a fork-shaped cross section with a main body and two substantially parallel walls that each comprise at least one through hole, wherein the first member is arranged between the two walls of the second member, having the through hole, and wherein said through hole of the first member and the through holes of the second member are aligned to define a channel. The expansion pin may be interpreted as a connector that is axially insertable in said channel to an end position and consecutively expandable radially relative to said channel, to connect the first and second member relative to each other. When the expansion pin system is inserted into the channel it results in an alignment of the through holes of the first and the second member.

The European patent publication EP 2187506 A1 discloses a number of adjustable locking devices located between segments of a cylindrical shell of a stator of an electric generator of a wind power turbine. These adjustable locking devices are configured to press the segments together circumferentially and lock the segments in a give position. The device of EP 2187506 A1 fails to disclose a second member that has a fork-shaped cross section with a main body and two substantially parallel walls that each comprises at least one through hole, wherein a first member is arranged between the two walls of the second member, having the through hole.

The expansion bolt of United States patent U.S. Pat. No. 1,120,409 and the anchor bolt disclosed in EP 3171040 A1 are acknowledged as further prior art.

An object of the present invention is to provide an assembly, that is improved relative to the prior art and wherein at least one of the above stated problems is obviated.

Said object is achieved with the assembly according to claim 1 of the present invention, comprising:
- a first and a second member, wherein;
  - the second member has a fork-shaped cross section with a main body and two substantially parallel walls that each comprise at least one through hole;
  - the first member is arranged between the two walls of the second member, having the through hole;
  - wherein said through hole of the first member and the through holes of the second member define a channel;
  - further comprising a connector that is axially insertable in said channel to an end position and consecutively expandable radially relative to said channel, to connect the first and second member relative to each other; and
  - wherein the connector, in an expanded state thereof, pushes the first member against the main body of the second member to define a pre-tensioned connection between the first member and the second member.

As a result of the pre-tensioned connection between the first member and the second member any load fluctuations going through the connector are reduced significantly resulting in very low fatigue damage levels compared to a non pre-tensioned connection.

The United States patent application US 2008/080946 A1 fails to disclose that the connector, in an expanded state thereof, pushes the first member against the main body of the second member to define a pre-tensioned connection between the first member and the second member. After all, a male flange end which may be considered the first member, is arranged in between two flanges of a female end of the connector, with a free end of said male flange end being disposed at a distance from the connector. From a perspective of alignment of the holes, as obtained by the expansion pin of US 2008/080946 A1, it makes perfect sense that the male flange end, i.e. the first member, has a free end. However, a perfect alignment is not desired in view of obtaining an optimal pre-tensioning of the connection between the first member and the second member.

Relative to the assembly of WO 2018/139929 (A1), a user may insert a connector into the channel to an end position in a first step, followed by a further step of consecutively expanding said connector radially relative to said channel, to thereby connect the first and second member relative to each other. In this way, the connector may be accurately and easily placed in the channel by a user with very limited hassle or force. Only when the connector is placed in its desired end position, it is expanded in the channel to connect the first and second member relative to each other. Use of a connector according to the invention also makes specially machined contact surfaces with an inclination corresponding to an inclination of the radially displaceable actuator redundant.

Relative to the older prior art of bolted flanges, large scale (e.g. M72) bolts are redundant. Also, the body may be less bulky than a flange comprising through holes to accommodate a bolt. As a result, the assembly according to the invention, requires less material, is therefore more compact and lighter, and also more elegant. Whereas thick parts need to be forged, smaller parts may also be rolled, possibly allowing the members to be formed with alternative and more attractive manufacturing methods. Also, the assembly according to the invention is scalable, providing the opportunity to arrange multiple connectors in axial direction of the members.

A further advantage of the proposed assembly relative to bolted flanges, is the absence of these flanges, that would provide a significant mass outside the path where forces travel during driving the assembly into a ground using a hammer. The mass of conventional flanges may result in bending of the neck of the flanges. These bending stresses currently result in significantly reduced life time of the welds of these flanges when installed with a conventional impact hammer.

An even further advantage of the proposed assembly relative to bolted flanges, is that it may be applied for connecting members under the waterline. On the one hand, longitudinal members of a limited length may be used, allowing smaller ships to transport them to a desired location for an offshore construction.

The successively tightening the bolts of a bolted flange—which are typically tightened in multiple steps, as mentioned above—is very time consuming and labor-intensive. The proposed assembly is less labor-intensive and time consuming than a connection having bolted flanges.

According to a preferred embodiment, the connector, in the expanded state thereof, pushes against faces of the through holes of the second member that are directed away from the main body thereof to define the pre-tensioned connection between the first member and the second member.

According to a further preferred embodiment, in the expanded state of the connector, wherein the connection between the first member and the second member is pre-tensioned, the through hole of the first member is arranged at an offset relative to the through holes in the second member. As mentioned above, said through hole of the first member and the through holes of the second member define a channel, which means that said through holes are positioned in a way that they are "substantially" aligned. However, a preferred offset may guarantee that there always remains a slight misalignment of the through hole of the first member relative to the through holes of the second member. This is advantageous, because the offset, i.e. the slight misalignment in the channel, guarantees that the connection between the first member and the second member may be optimally pre-tensioned. After all, the connector is configured to expand in the channel, wherein the connector pushes the first member against the main body of the second member. In order to optimally push the first member towards the main body of the second member, it is beneficial if the side of the connector that is directed towards the main body does not come into contact with the inner walls of the through holes in the parallel walls of the second member. In this way, the side of the connector that is directed towards the main body can fully transfer its compressive force to the first member that is pressed towards and against the main body of the second member to obtain the desired pre-tensioning.

According to a preferred embodiment, the connector comprises:
  a compacted state, wherein the connector has a size that is freely insertable into and out of the channel; and
  a connecting state, wherein the connector is expanded in the channel to connect the first and second member relative to each other.

In the compacted state, play between the connector and the inner wall of the channel allows the connector to be easily inserted into the channel. Afterwards, a high axial clamping force may be provided by the connector, which has the advantage that the assembly is less susceptible for load variations. This is best understood when compared to how a bolted joint carries a direct load. An adequately pretensioned bolt can survive in an application that an untightened, or loose bolt, would fail in a short period of time. The bolt only 'feels' a small portion of the applied load.

The invention is furthermore directed to a method of assembling a first and a second member that each comprises at least one through hole, said method comprising the steps of:
  positioning the through holes of the first and the second member to define a channel;
  inserting a connector into the channel to an end position;
  consecutively expanding said connector radially relative to said channel, to thereby connect the first and second member relative to each other; and
  the expanded connector pushing the first member against the main body of the second member to define a pre-tensioned connection between the first member and the second member.

In a preferred embodiment, the above mentioned method steps are preceded by the step of positioning at least one of said first and said second member by hoisting thereof, wherein a hoisting equipment engages at least one of the through holes of said respective first or second member. As the connector may be a separate unit that is only inserted into the channel during assembly, the through holes in the first and the second member may be effectively used during hoisting thereof.

In a further preferred embodiment of said method, an elongate member, preferably a rod, is arranged through at least one of the through holes to connect the respective first or second member to the hoisting equipment.

Further preferred embodiments are the subject of the dependent claims.

In the following description preferred embodiments of the present invention are further elucidated with reference to the drawing, in which:

FIG. 5 is a perspective view of a clamp according to the first embodiment;

FIG. 6 is a detailed cross sectional view of the clamp of FIG. 5;

FIG. 7 is an exploded perspective view of the clamp of FIG. 5;

FIGS. 8-11 show cross sectional views of successive steps of assembling an assembly according to the first embodiment;

Figure 1:
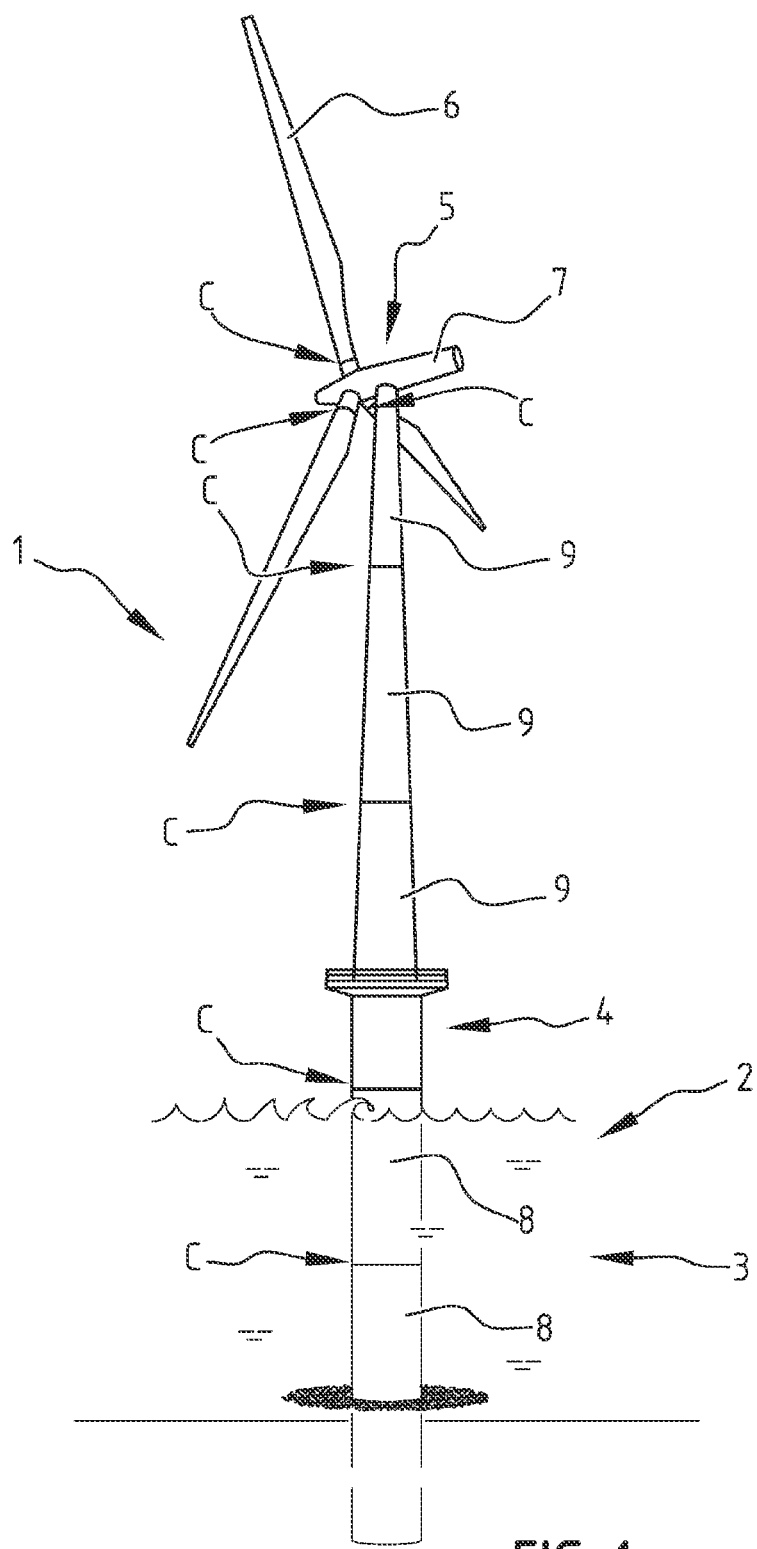
FIG. 1 is a schematic view of an offshore wind turbine tower supported by a monopile.

An example of an offshore construction comprising multiple connections C where an assembly according to the invention may be applied is shown in FIG. 1. An offshore wind turbine tower 1 is supported by a supporting base structure 2 which is in FIG. 1 embodied as a monopile 3 with a transition piece 4. The skilled person will understand that similar connections are present for alternative supporting base structures 2, such as (not shown) jackets.

The connections C may be applied between separate members 8 of the monopile 3, between the monopile 3 and the transition piece 4, between the transition piece 4 and the turbine tower 1, between members 9 of the turbine tower 1, and between a rotor blade 6 and a hub of a rotor.

During use, a wind turbine 5 will be oriented such that the rotor blades 6 are optimally driven by the available wind power. The rotor blades 6 drive a (not shown) generator in the nacelle 7, wherein the generator generates electricity. The wind turbine 5 causes alternating loads on any connection C in the construction, and dependent on the wind direction, specific parts of the connection C have to absorb most of the loads.

According to the prior art (FIG. 2), an assembly 10 configured to connect a first member 11 and a second member 12 normally comprises flanges 13, 14. These flanges 13, 14 are provided with through holes 15, 16, which are aligned. A bolt 17 and nut 40 assembly is then arranged through the aligned through holes 15, 16, and used to clamp the flanges 13, 14 to each other. As already described, currently M72 bolts 17 are used for connecting a wind turbine tower 1 to a monopile 3 or transition piece 4. The bolts 17 itself are heavy and the tools for tightening the bolts 17 are also heavy and hard to handle. Moreover, the preload on the bolts 17 must be regularly checked and adjusted, periodically requiring significant maintenance work.

In order to accommodate the through holes 15, 16 and create an effective preload between both flanges 13, 14, the flanges 13, 14 need to be relatively thick in both axial direction.

In order to prevent that the flange becomes an effective lever when a significant tensile load is applied on the steel wall that is welded to flange 14 the flange also needs to be wide (in the radial direction).

Figure 2:
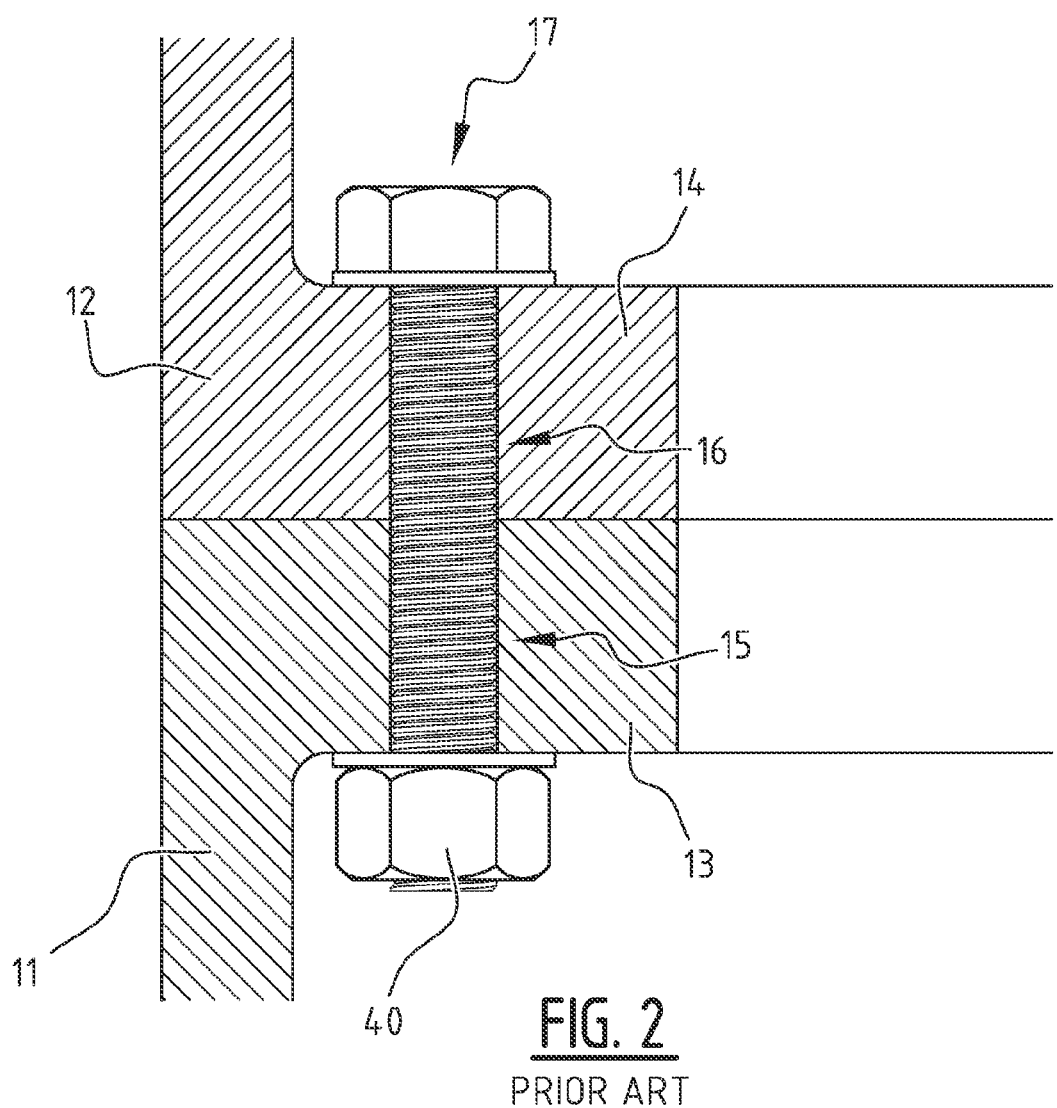
FIG. 2 is a cross sectional view of a flange connection according to the prior art.

The assembly according to the present invention comprises a first member 18 and a second member 19, each comprising at least one through hole 20-22. The through holes 20-22 may be directly arranged in the first member 18 and the second member 19, and consequently flanges 13, 14 as shown in FIG. 2 are redundant. This has several advantages, one of them being a saving of material. The second member 19 is made up out of an amount of material that is approximately also present in a single one of the flanges 13, 14 of FIG. 2. However, the material required for the first flange 13 in FIG. 2 is completely saved. Also, due to the absence of flanges 13, 14, there is less weight outside the line of travel of forces through the assembly. Moreover, a labour intensive and costly welding operation is prevented.

A taper angle at the bottom of member 19 and a taper angle at the top of member 18 allows for a certain amount of ovality in either member 18 or 19 to be forced back into a round shape under the force of gravity by pushing member 19 into member 18.

In the shown embodiment, the first member 18 comprises one through hole 20, and the second member comprises two through holes 21, 22. In the assembly, the through holes 20-22 of the first 18 and the second member 19 together define a channel 23. A connector 24 is axially insertable in said channel 23 to an end position and consecutively expandable radially relative to said channel 23, to connect the first member 18 and the second member 19 relative to each other.

Figure 4:
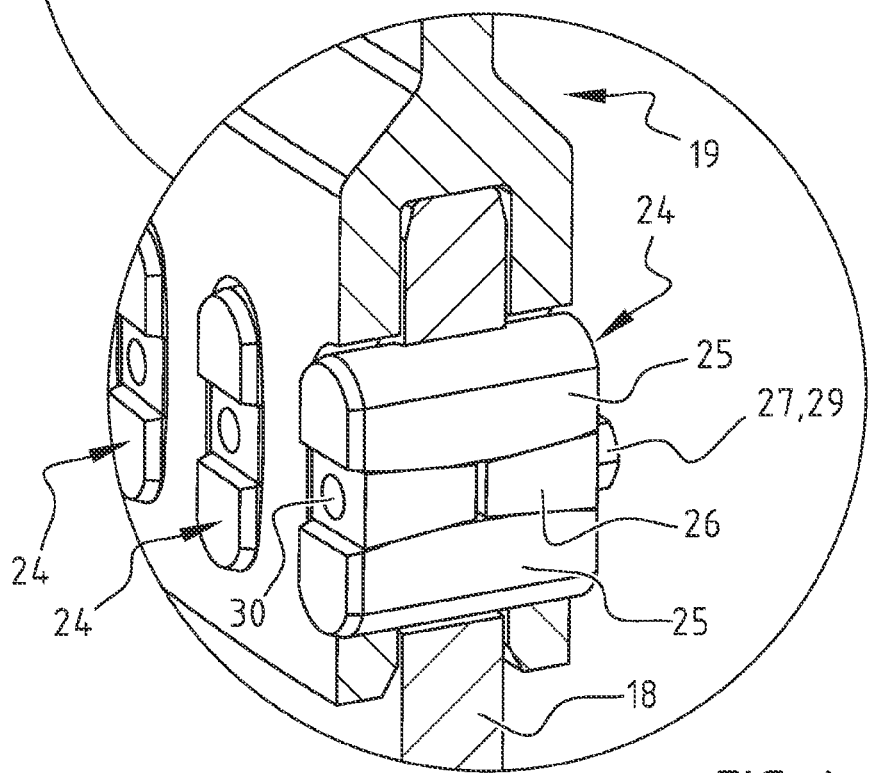
FIG. 4 is a cross sectional perspective view of the assembly shown in FIG. 3.

The connector 24 comprises a compacted state (shown FIGS. 9 and 10), wherein the connector 24 has a size that is freely insertable into and out of the channel 23, and a connecting state (e.g. shown in FIGS. 4 and 11) wherein the connector is expanded in the channel 23 to connect the first 18 and second member 19 relative to each other.

Figure 11:
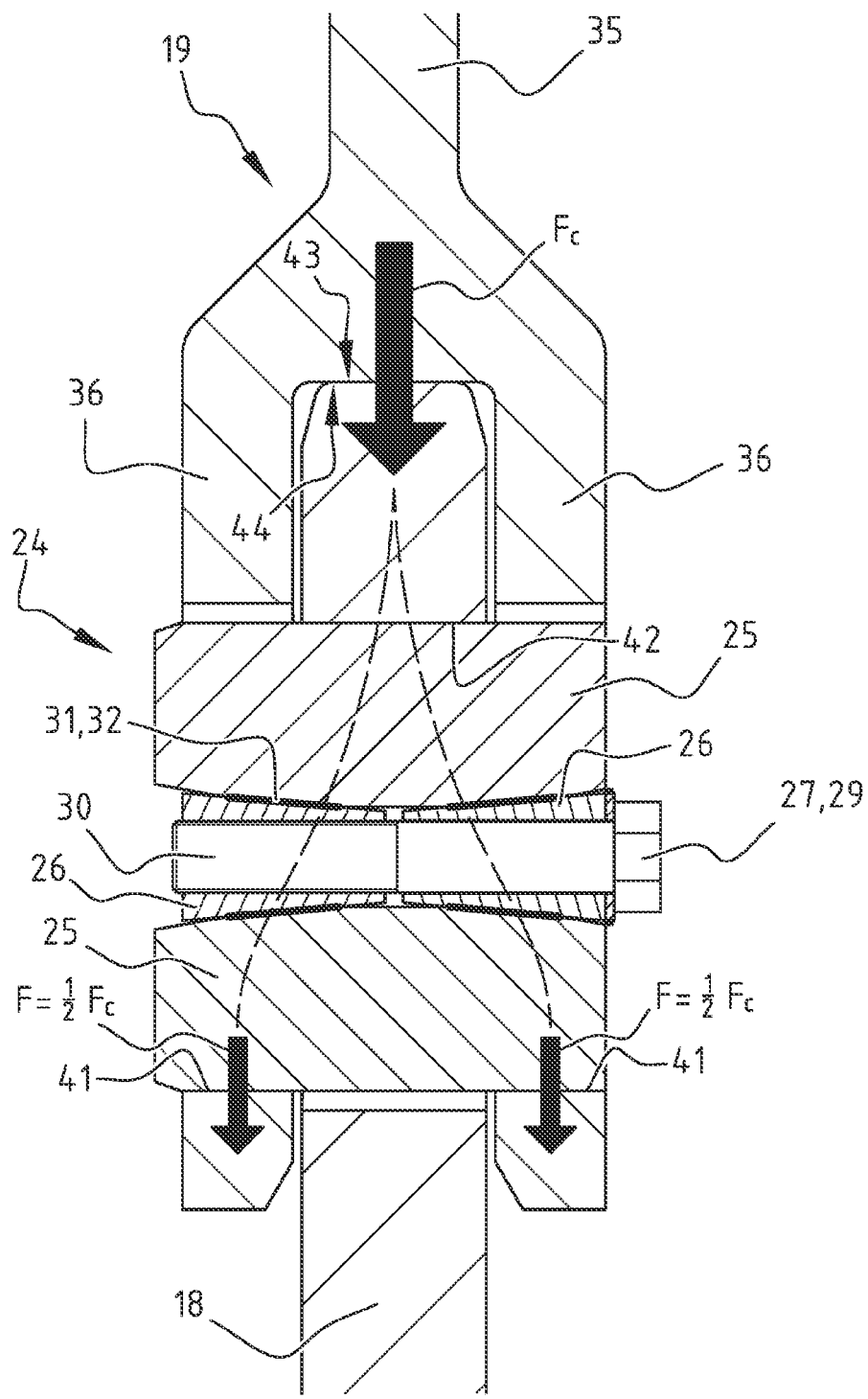

The description is this paragraph relates to the orientation shown in FIG. 11, but the skilled person will understand the same principle may also be applied in other orientations, such as transverse or upside down relative to FIG. 11. In the connecting state shown in FIG. 11, the connector 24 contacts at its lower side with faces 41 formed at the lower side of the respective through holes 21, 22 of the second member 19. The upper side of the connector 24 contacts a face 42 that is arranged at the upper side of the through hole 20 in the first member 18. In the expanded state of the connector 24, the connector 24 pushes faces 41 of the second member 18 away from face 42 of the first member 18. Consequently, the second member 19 is pushed downward relative to the first member 18, and a clamping contact is formed between a face 43 defined by the upper side of the first member 18, and a face 44 defined by the second member 19. Thus, by expanding the connector 24, a pre-tensioned connection between the first 18 and the second member 19 can be formed. The faces 41, 42, 43, 44 can be best seen in FIG. 8.

By having sufficient pretension, the load fluctuations going through the connector 24 are reduced significantly resulting in very low fatigue levels.

The connector 24 comprises at least one expansion block 25, at least one wedge 26, and an actuator 27 configured to displace the wedge 26 relative to the expansion block 25. The wedge 26 has an inclined surface 28 facing the at least one expansion block 25.

The connector 24 preferably comprises at least one wedge 26 that is arranged between two expansion blocks 25, and more preferably the connector 24 comprises two wedges 26. In the shown embodiment, two wedges 26 are arranged between two expansion blocks 25. The two wedges 26 are symmetrically arranged with inclinations of the inclined surface 28 thereof directed away relative to each other.

The actuator 27 may be a bolt 29 that engages in a threaded recess 30 of the wedge 26. Optionally a washer 38 may be placed between the head of the bolt 29 and the wedge 26. By turning the bolt 29, the wedges 26 may be pulled together over a distance corresponding to the thread of the bolt 29. When two wedges 26 are used, the displacement is divided over both wedges 26. The thread may be interpreted as a first transmission and the division over both wedges as a second transmission. Via the inclined surface 28, which may be interpreted as a third transmission, the connector 24 is expanded, i.e. the expansion blocks 25 are pressed outward relative to each other when the wedges 26 move towards each other. One of the expansion blocks 25 engages with the faces 41 of the second member 18, i.e. the lower expansion block 25 shown in FIG. 11. The other expansion block 25, i.e. the upper expansion block 25 shown in FIG. 11, engages with the face 42 of the first member 18. In this way, if the expansion blocks 25 are pressed outward relative to each other, the above described pre-tensioned connection between the first 18 and the second member 19 can be formed.

The inclined surface 28 of said wedge 26 may comprises an inclination with an angle of less than 15°, preferably less than 10°, more preferably less than 8°, and most preferably equal to or less than 6°, relative to a displacement direction of said wedge 26. This displacement direction coincides with the longitudinal direction of the bolt 29. By providing an inclination with a relatively flat angle, an axial clamping force $F_c$ results after decomposition thereof in only a very limited radial force component. The relatively small value of the radial force component is typically less than the friction at the contact surface between wedge 26 and clamping block 25, resulting in a self-locking contact between the wedges 26 and the clamping block 25 in the connecting state. As a result, the wedges 26 remain in place even if the bolt 29 forming the actuator 27 for originally displacing the wedges 26 would be loosened or even removed. Although it is preferable that the bolt 29 remains tightened, this self-locking aspect prevents that the bolt 29 may experience stress fluctuations during use. In this way, a reliable and fail-safe assembly is provided.

The expansion block 25 has a surface 31 of which at least a portion 32 is a contact surface with the wedge 26 having an orientation corresponding with the inclined surface 28 of said wedge 26. When the orientation of the contact surface and the inclined surface 28 are substantially equal, a reliable mating interface is obtained.

If only a portion 32 of the surface 31 is a contact surface, the contact surface may remain constant over a displacement range of the wedge 32. If the wedge 26 that is shown on the right side in FIGS. 5-7 is moved inward, the contact surface will not further increase once its front edge 39 passes edge 40 of portion 32.

Figure 3:
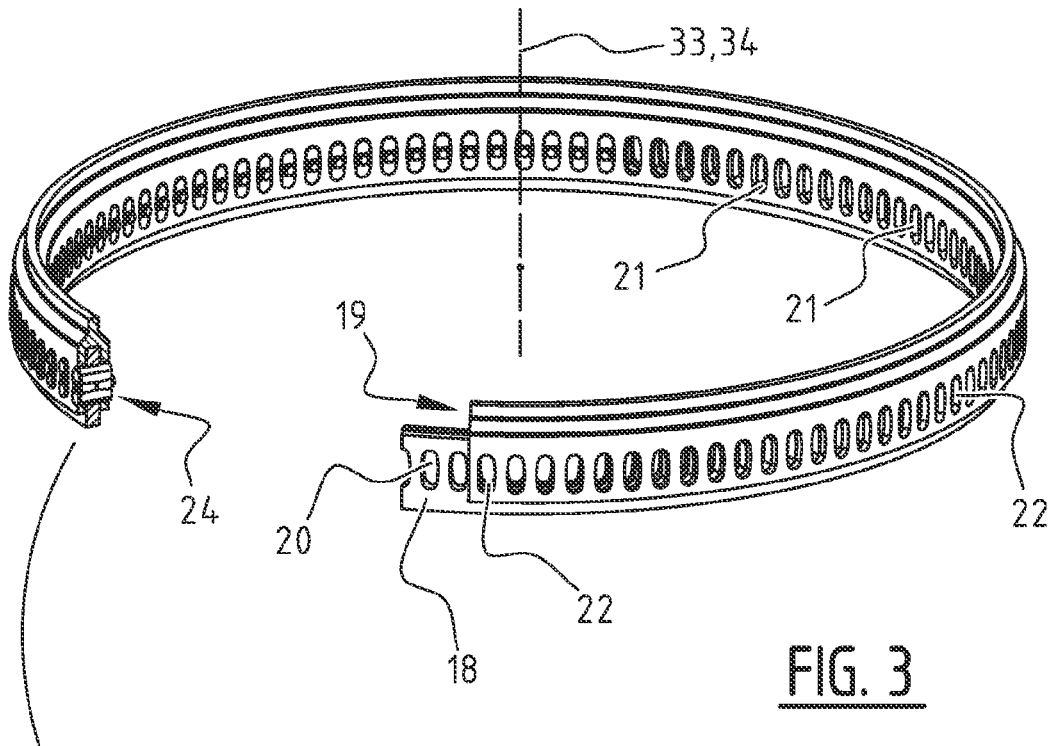
FIG. 3 is a perspective view of an assembly according to a first embodiment of the present invention.
Figure 12:
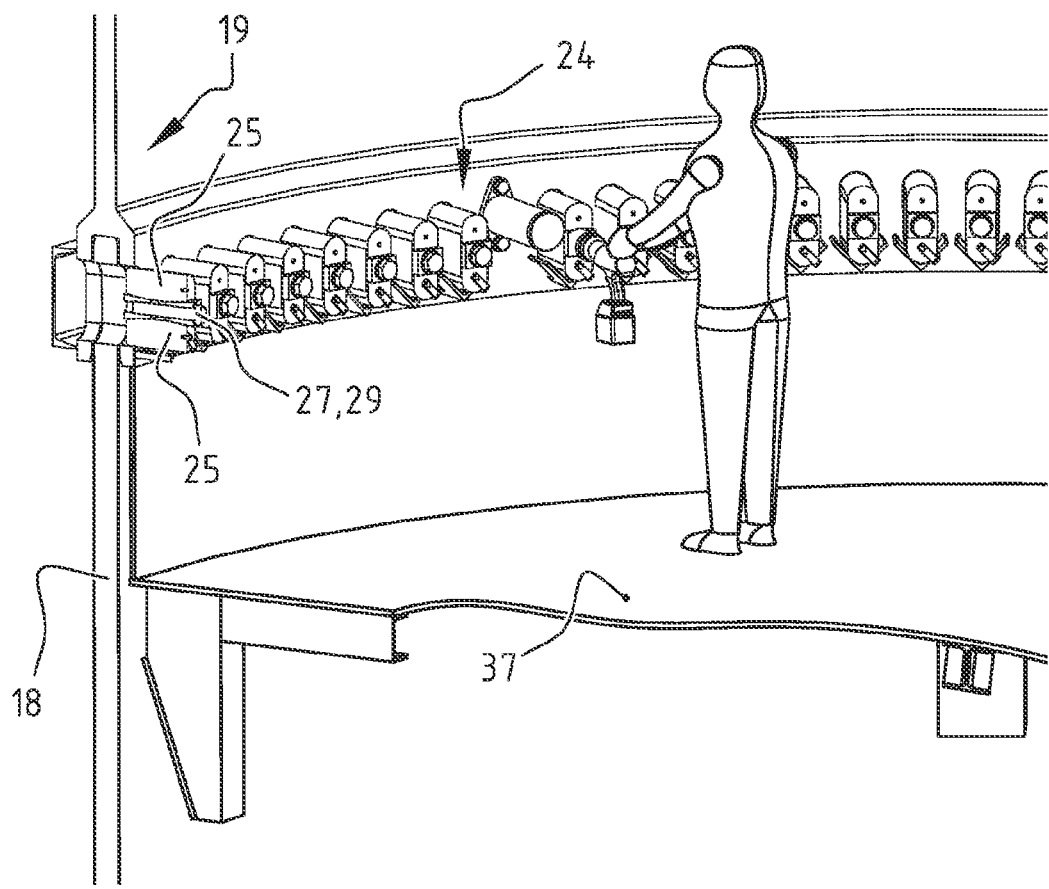
FIG. 12 is a perspective view inside a monopile of a wind turbine.

As can be best seen in FIGS. 3 and 12, the first 18 and the second member 19 are overlapping tubular members and the through holes 20-22 are radially aligned relative to the tubular members to define the channel 23 that is radially extending. The first 18 and second member 19 have respective longitudinal axes 33, 34 that are at least parallel, and preferably coincide (FIG. 3). In the prior art situation shown in FIG. 2, the nut 40 had to be accessible with tools. However, according to the present invention, an airtight platform 37 may be provided without preventing access to the connection between the first 18 and second member 19. To the contrary, it is exactly this airtight platform 37 that may provide a comfortable support for a user to readily place connectors 24 in respective channels 23.

A symmetrical force transmission may be obtained if, according to the shown preferred embodiment, the second member 19 has a fork-shaped cross section with a main body 35 and two substantially parallel walls 36 that each comprises at least one through hole. In this embodiment, the first member 18 is arranged between the two walls 36 of the second member 19, having the through holes 21, 22, and said through hole 20 of the first member 18 and the through holes 21, 22 of the second member 19 are positioned to define the channel 23. The arrows in FIG. 11 indicate how a clamping force $F_c$ is symmetrically distributed.

The channel 23 preferably has an elongate cross section extending in a longitudinal direction of at least one of said first 18 and said second member 19. Relative to channels having a circular shape, such an elongate cross sectional shape provides a relatively large amount of material between successive channels 23 if multiple channels 23 and connectors 24 are arranged along a circumference of the first 18 and the second member 19.

Figure 13:
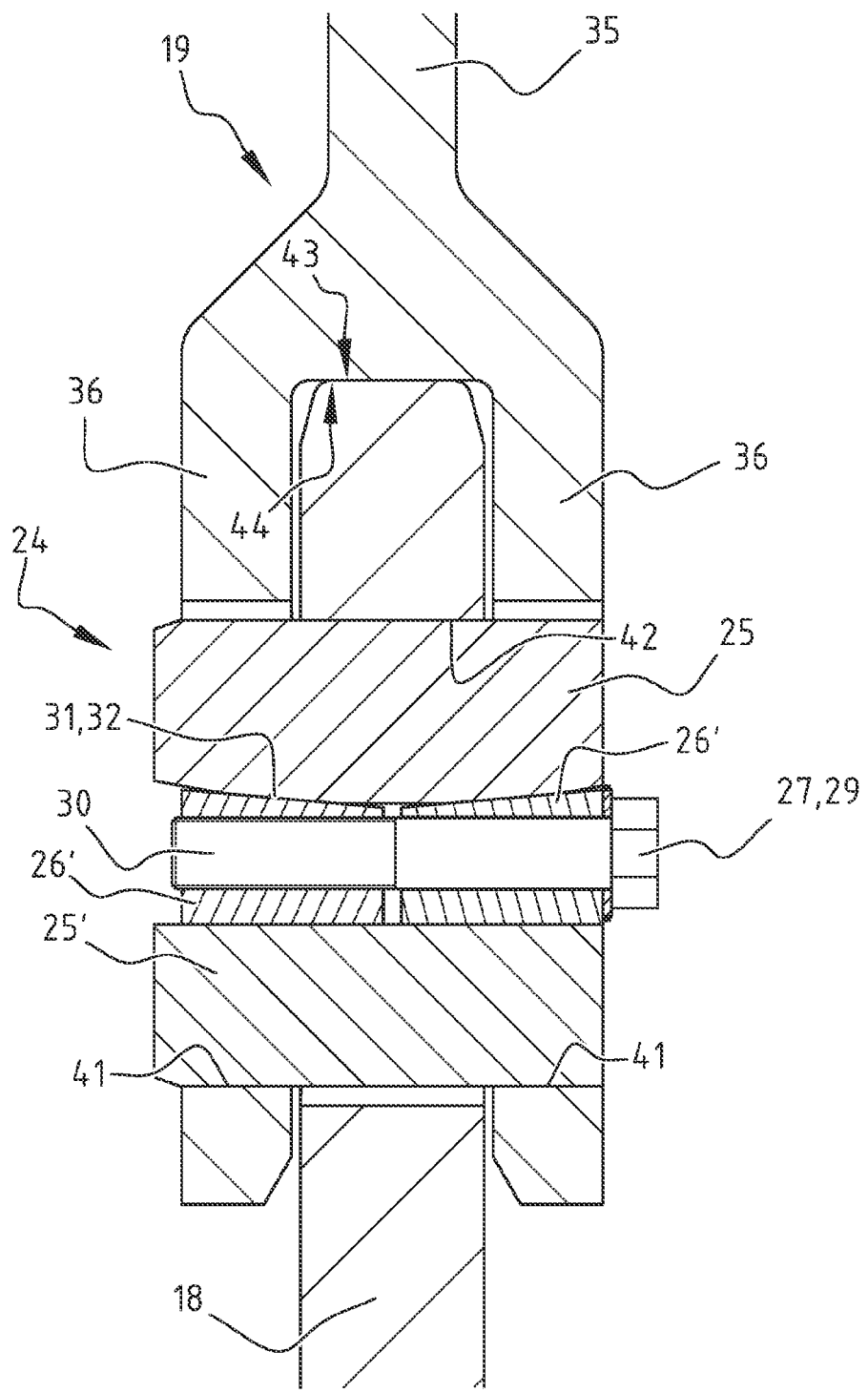
FIG. 13 is a cross sectional view of an assembly according to a second embodiment of the present invention.

In a second embodiment of the invention, the wedges 26' are only inclined on one side relative to a displacement direction of said wedges 26', i.e. the upper side in FIG. 13. The other side of each wedge 26', i.e. the lower side in FIG. 13, is substantially parallel to the displacement direction of said wedge 26'. Expansion block 25' has two substantially parallel sides, which allows it to be placed in advance of the wedge 26' and other expansion block 25 of the assembly. Expansion block 25' also better facilitate de-assembly.

Figure 14:
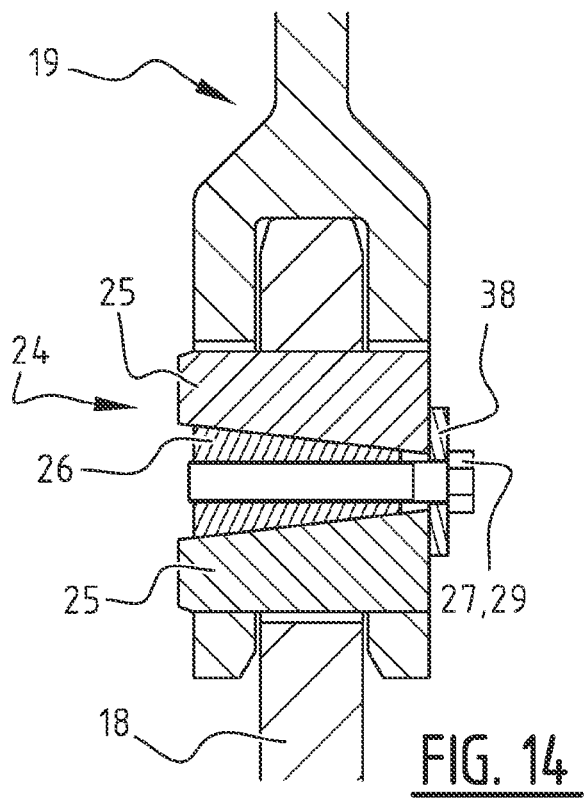
FIG. 14 is a cross sectional view of an assembly according to a third embodiment of the present invention.

A third embodiment of the invention, wherein a single wedge 26 is applied, is shown in FIG. 14.

Figure 15:
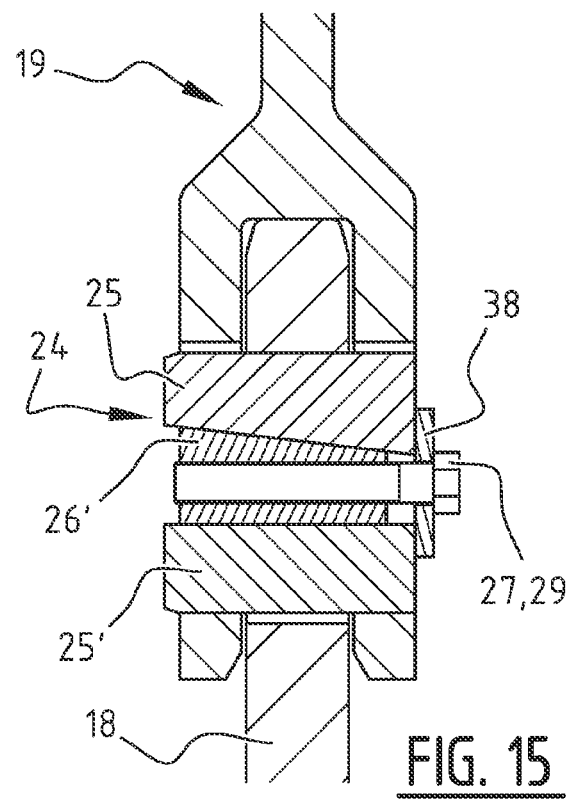
FIG. 15 is a cross sectional view of an assembly according to a fourth embodiment of the present invention.

A fourth embodiment of the invention is shown in FIG. 15. This embodiment combines a single wedge 26 according to the embodiment of FIG. 13 with an expansion block 25' that has two substantially parallel sides according to the embodiment of FIG. 13.

In a (not shown) embodiment, the clamping blocks 25 may be connected by a flexible member enclosing the space between the clamping blocks 25 where the wedges 26 are arranged. In such an enclosed space, lubricant may be added.

Figure 16:
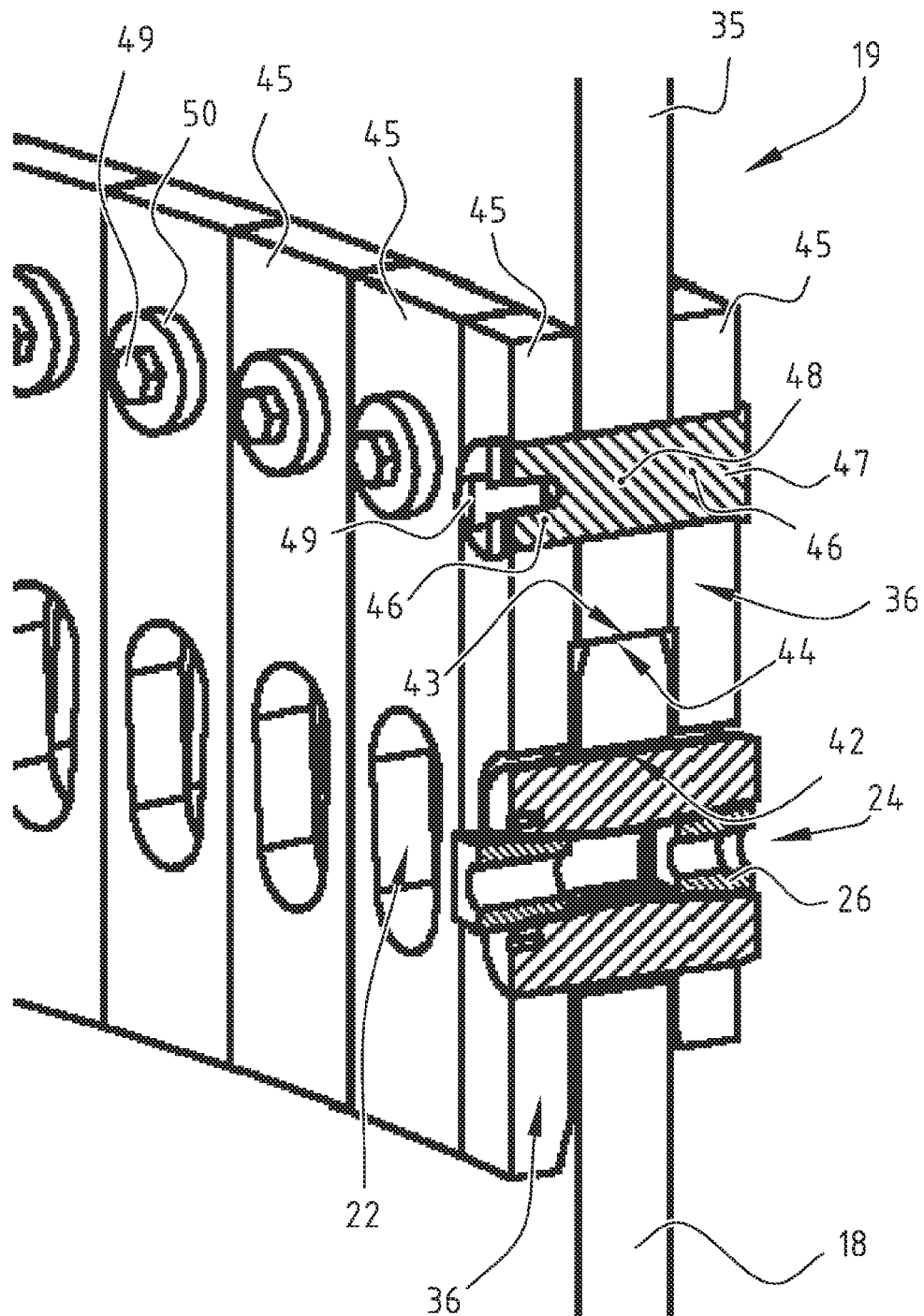
FIG. 16 is a cross sectional view of an assembly according to a fifth embodiment of the present invention.

According to a fifth embodiment of the invention that is shown in FIG. 16, the second member 19 is embodied as an assembly rather than a one piece element. The fork-shaped cross section is defined by the assembly of the main body 35 and the two substantially parallel walls 36. The walls 36 partially extend along, and are connected to, opposite sides of this main body 35. The walls 36 may be defined by a plurality of plates 45. The plates 45 may comprise though holes 46 to allow a pin 47 to pass through said plates 45 and through a corresponding through hole 48 in the main body 35 of the second member 19. In the shown embodiment, a bolt 49 and washer 50 are being used to clamp the plates 45 that define the side walls 36 to the main body 35. The bolts 49 are preferably arranged on an inside of the tubular first 18 and second member 19 to allow easy access. There is a modest pretension between the main body 35 and the plates 45 that are arranged on opposite sides thereof. Upon tightening of the connector 24 the dominant load transfer path however is through an applied tensile force through the plates 45 that is transferred into a shear force in the pin 47. Connector 24, both plates 45 on the inner and the outer side of the second member 19 and pin 47 all form part of the pretension load transfer path. Consequently, very low load fluctuations are felt by these components when an external load is applied at the connection. In a preferred embodiment, each connector 24 is associated with an inner plate 45 and one outer plate 45. The clamping action of the fifth embodiment is similar to the other embodiments.

Relative to second member 19 comprising a one piece fork-shaped cross section, an assembly according to the fifth embodiment has several advantages and disadvantages.

A disadvantage of the fifth embodiment is the open structure, formed by the plurality of separate plates 45. This may limit the main use of the fifth embodiment to so-called in-air conditions where the construction is not continuously exposed to salt spray, as would be the case in the so-called splash zone. If used in offshore applications, the fifth embodiment is preferably applied well above the splash zone, i.e. well above sea level. However, if a sealing is used in-between the plurality of separate plates 45, this fifth embodiment may also find its use at the splash zone or even below. The individual plates 45 may also be designed so that the plates overlap one another at the interface to adjacent plates including an overlap that seals the interface and prevents water and/or air penetration.

On the other hand, the fifth embodiment also comprises a number of important advantages.

Firstly, it is not required to make a solid ring, which typically requires a forging process that—in the required sizes—may only be applied by a limited number of highly specialized companies. The plates 45 and pins 47 according to the fifth embodiment can easily be produced by most metal work shops allowing the essential part of the connection to be produced by a large number of companies.

Secondly, once a solid ring is forged, forming of a groove therein is time intensive and causes a significant amount of steel to be removed in a machining step. The production of plates 45, however, has the benefit that no material needs to be removed in between the plates 45 as is the case with a solid forging that requires machining to remove the groove.

Thirdly, large forged rings are heavy and bulky, resulting in logistic challenges and costs. Plates 45 and pins 47 are easy to transport, and—because they may be made by a large number and broader range of companies—transport may be minimized if local metal work shops produce these parts.

Fourthly, the forged and machined ring needs to be welded to the second member 19, thereby possibly deforming the face 44 of said second member 19. This deformation may result in so-called waviness and may have a negative effect on the structural integrity of the connection since the resulting gap needs to be closed using the pre-stress applied by the connectors 24.

Finally, increased flexibility is obtained if a number of plates 45 is provided with additional functionality, such as alignment functionality.

In the shown embodiments, the first 18 and the second member 19 are members of an offshore construction, more in particular of an offshore wind turbine construction 1. Each of the first 18 and the second member 19 may be an upright member of a monopile 3. It is however explicitly mentioned that the invention is not limited to offshore use. Especially the fifth embodiment as described above is particularly suitable for use in onshore wind turbine applications. Onshore, the combination of the limited diameter of tubulars that can be transported over the road, the ever increasing tower height to catch stronger winds, and growing wind turbines power ratings results in connections between tubulars that are exposed to very high load levels. These load levels may even exceed typical L-flange load levels. In comparison with conventional L-flange connections, the absence of two welds between flanges and tubulars and the absence of the expensive flanges themselves makes the invention, and especially the fifth embodiment, a commercially attractive solution even at lower load levels.

Alternatively, one of the first 18 and the second member 19 may be a rotor blade 6 of a wind turbine 1, and the other of the first 18 and the second member 19 may be arranged on a hub, and by example said first 18 or second member 19 may be arranged on a (not shown) pitch bearing attached to a hub. Such pitch bearing is known in the art and include ball- or roller bearings. The connection between bearing and blade may be established via either an inner or an outer raceway of the bearing as the case may be on a two-raceway bearing. FIG. 1 shows this connection C, as well as many other places where a similar assembly may be applied as connection C.

The method of assembling the first 18 and the second member 19 that each comprise at least one through hole 20-22 according to the invention, comprising the steps of:
  positioning the through holes 20-22 of the first 18 and the second member 19 to define a channel 23 (step from FIG. 8 to FIG. 9);
  inserting a connector 24 into the channel 23 to an end position (step from FIG. 9 to FIG. 10); and
  consecutively expanding said connector 24 radially relative to said channel 23, to thereby connect the first 18 and second member 19 relative to each other (step from FIG. 10 to FIG. 11).

Although not shown, the method of assembling may be preceded by the step of positioning at least one of said first 18 and said second member 19 by hoisting thereof, wherein a (not shown) hoisting equipment engages at least one of the through holes 20-22 of said respective first 18 or second member 19. An elongate member, preferably a rod, may be arranged through at least one of the through holes 20-22 to connect the respective first 18 or second member 19 to the hoisting equipment.

The same through holes 20-22 may also be used for engagement with an installation tool.

Although they show preferred embodiments of the invention, the above described embodiments are intended only to illustrate the invention and not to limit in any way the scope of the invention. FIG. 1 shows an offshore wind turbine tower construction, but the assembly according to the invention is not limited to offshore use, nor to wind turbine applications alone.

It is remarked that in the description of the shown embodiments, the lower member is denoted as the first member 18, and that the upper member is denoted as the second member 19. The skilled person will understand that the lower member could be interpreted as a second member 19 and the upper member could be interpreted as a first member 18 within the scope of the invention.

It should be understood that where features mentioned in the appended claims are followed by reference signs, such signs are included solely for the purpose of enhancing the intelligibility of the claims and are in no way limiting on the scope of the claims. The scope of the invention is defined solely by the following claims.

The invention claimed is:
1. A connection assembly for a wind turbine, comprising:
a first member and a second member,
wherein the second member has a fork-shaped cross section with a main body arranged between two parallel walls that each comprise at least one through hole;
wherein the first member is arranged between the two walls of the second member, having the through hole;
wherein a through hole of the first member and the through holes of the second member define a channel; and
a connector axially insertable into said channel to an end position and consecutively expandable radially relative to said channel, to connect the first and second member relative to each other,
wherein the connector, in an expanded state thereof, pushes the first member in a radial direction relative to said channel against a face of the main body of the second member to define a clamping contact and thereby a pre-tensioned connection in said radial direction relative to said channel between a face of the first member and the face of the main body of the second member.

2. The connection assembly of claim 1, wherein the connector comprises:
at least one expansion block;
at least one wedge having an inclined surface facing the at least one expansion block; and
an actuator configured to displace the at least one wedge relative to the expansion block;
wherein the connector preferably comprises at least one of:
at least one wedge that is arranged between two expansion blocks; and
two wedges, wherein the two wedges are at least one of:
arranged between two expansion blocks; and
symmetrically arranged with inclinations thereof directed away relative to each other.

3. The connection assembly of claim 2, wherein the actuator is a bolt that engages a threaded recess of the wedge.

4. The connection assembly of claim 2, wherein the inclined surface of said wedge comprises an inclination with an angle of less than 15° relative to a displacement direction of said wedge.

5. The connection assembly of claim 2, wherein the expansion block has a surface of which at least a portion is a contact surface with the wedge having an orientation corresponding to the inclined surface of said wedge.

6. The connection assembly of claim 1, wherein at least one of:
the connector, in the expanded state thereof, pushes against faces of the through holes, of the second member that are directed away from the main body thereof to define the pre-tensioned connection between the first member and the second member; and
in the expanded state of the connector, wherein the connection between the first member and the second member is pre-tensioned, the through hole of the first member is arranged at an offset relative to the through holes in the second member.

7. The connection assembly of claim 1, wherein the connector comprises:
a compacted state, wherein the connector has a size that is freely insertable into and out of the channel; and
a connecting state, wherein the connector is expanded in the channel to connect the first and second member relative to each other.

8. The connection assembly of claim 1, wherein the first and the second member:
are overlapping tubular members and the through holes are radially aligned relative to the tubular members to define the channel that is radially extending; and
have longitudinal axes that are parallel or coincident.

9. The connection assembly of claim 1, wherein said channel has an elongate cross section extending in a longitudinal direction of at least one of said first and said second members.

10. The connection assembly of claim 1, wherein multiple channels and connectors are arranged along a circumference of the first and the second members.

11. The connection assembly of claim 1, wherein at least one of:
the first and the second members are members of an offshore wind turbine construction; and
each of the first and the second members is an upright member of a monopile.

12. The connection assembly of claim 1, wherein:
one of the first and the second members is a rotor blade of a wind turbine; and
the other of the first and the second member is preferably arranged on a hub.

13. The connection assembly of claim 1, wherein the second member comprises an assembly of the main body and the two parallel walls.

14. A method of assembling a first and a second member of a wind turbine assembly, where the first and second members each comprise at least one through hole, wherein the second member has a fork-shaped cross section with a main body arranged between two parallel walls that each comprise at least one through hole, said method comprising:
arranging the first member between the two walls of the second member;
positioning the through holes of the first and the second member to define a channel;
inserting a connector into the channel to an end position; and
consecutively expanding said connector radially relative to said channel, to thereby connect the first and second member relative to each other,
wherein the expanded connector pushes the first member in a radial direction relative to said channel against a face of the main body of the second member to define a clamping contact and thereby a pre-tensioned connection in a radial direction relative to said channel between a face of the first member and the face of the main body of the second member.

15. The method of claim 14, wherein:
said method is preceded by the step of positioning at least one of said first and said second members by hoisting thereof, wherein a hoisting equipment engages at least one of the through holes of said respective first or second member.

16. The method of claim 14, further comprising arranging an elongate member through at least one of the holes to connect the respective first or second member to the hoisting equipment.

* * * * *